Figure 1:
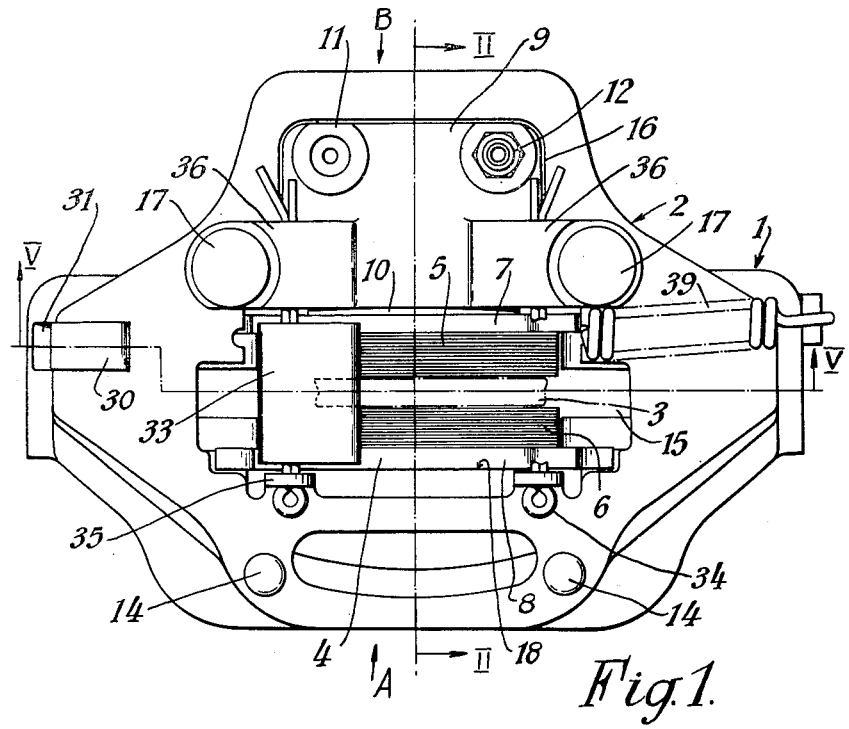

Nov. 24, 1964     L. C. CHOUINGS     3,158,230
SLIDING PLATE-TYPE SPOT DISC BRAKES
Filed Sept. 11, 1961     5 Sheets-Sheet 5

INVENTOR
Leslie Cyril Chouings
BY
Lawrence J. Winter
ATTORNEY

United States Patent Office 3,158,230
Patented Nov. 24, 1964

3,158,230
SLIDING PLATE-TYPE SPOT DISC BRAKES
Leslie Cyril Chouings, Leamington Spa, England, assignor to Automotive Products Company Limited, Leamington Spa, England
Filed Sept. 11, 1961, Ser. No. 137,239
Claims priority, application Great Britain, Sept. 12, 1960, 31,385/60
11 Claims. (Cl. 188—73)

This invention relates to disc brakes of the kind in which the reaction force resulting from contact of a brake pad or pads, on one side of the brake disc with the brake disc, results in sliding movement of a sliding member in a plane normal to the plane of rotation of the brake disc to bring the pad, or pads on the opposite side of the brake disc into contact therewith. Disc brakes of this kind will therefore be referred to in the present specification as "disc brakes of the kind hereinbefore set forth."

It is well known that with a disc brake, during a braking operation forces are set up which act respectively in a direction substantially normal to the plane of rotation of the brake disc, and referred to in the present specification as the clamping force, and in a direction substantially parallel to the plane of rotation of the brake disc, and referred to in the present specification as the "drag force." Disc brakes of the kind hereinbefore set forth have the advantage that they can be constructed so that the clamping force only is taken by the sliding member, thus permitting this member to be of lighter construction than is necessary if the same has also to take the drag force.

However, hitherto, and so far as is known, in practice the most common constructions of disc brakes of the kind hereinbefore set forth, have a sliding member constructed as a saddle substantially of U section which is supported in position, so as to straddle the brake disc and extend over a peripheral portion of the brake disc, with the latter located between the limbs. This construction has the disadvantage that braking efficiency can be seriously affected due to spreading of the limbs of the U section saddle caused by the clamping force taken by the saddle, during braking, the limbs being in effect cantilevers interconnected about one end. This disadvantage can only be overcome with existing constructions if the saddle is made of heavy construction so as to be sufficiently rigid to resist the clamping force.

The present invention however overcomes the above disadvantage by providing a sliding member which avoids the cantilever construction resulting from the U saddle arrangement, the invention enabling a sliding member of lighter construction than hitherto to be constructed which at the same time provides the necessary rigidity to resist the clamping force. Thus it is proposed in accordance with the present invention to provide a sliding member in the form of a closed loop, perpendicular to the plane of rotation of the brake disc so as to encircle the pads and a peripheral portion of the brake disc, and which is so arranged that the clamping force tends to separate those portions of the sliding member which lie parallel to the disc, and are resisted by the portions thereof which interconnect the first-mentioned portions.

A disc brake according to the invention therefore comprises for example a fixed support, a sliding member carried by the fixed support so as to be slidable thereon, said sliding member forming a closed loop perpendicular to the plane of rotation of the brake disc, so as to encircle the pads and a peripheral portion of the brake disc, actuating means carried by the sliding member so as to be located on one side of the brake disc, and operable to move the pad or pads on that side of the brake disc into contact with the brake disc, such contact resulting in sliding movement of the sliding member to bring the pad or pads on the other side of the brake disc into contact therewith, the sliding member being arranged, so that the clamping force tends to separate those portions of the sliding member which lie parallel to the disc, and are resisted by the portions thereof which interconnect the first-mentioned portions.

The sliding member can be of one piece construction or can be built up from separate portions riveted or otherwise secured together. For example the required closed loop construction can be obtained by forming the sliding member as a flat plate made, as a one piece structure or built up from laminar portions, which is arranged on the fixed support so that the plane of the flat plate lies perpendicular to the plane of rotation of the brake disc, the flat plate having an opening to receive a peripheral portion of the brake disc, and the brake pads on either side of the brake disc.

With the disc brake construction according to the invention the brake pads can be supported so that the drag force is taken wholly by the fixed support, the sliding member taking only the clamping force.

Figure 2:
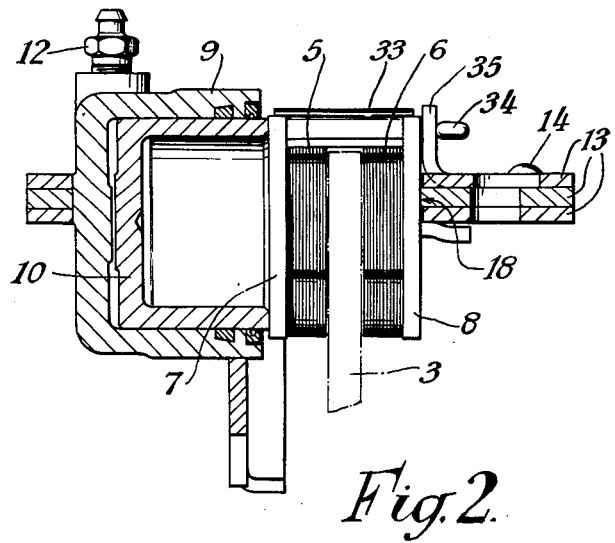
Figure 3:
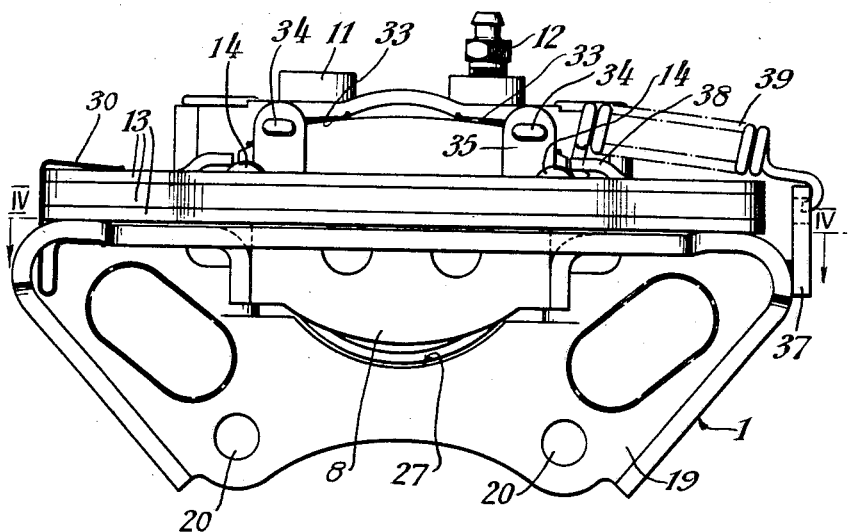
Figure 4:
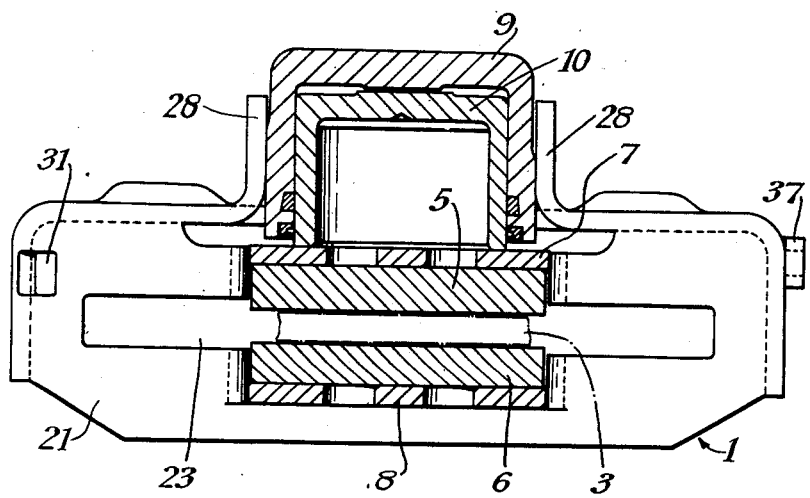
Figure 5:
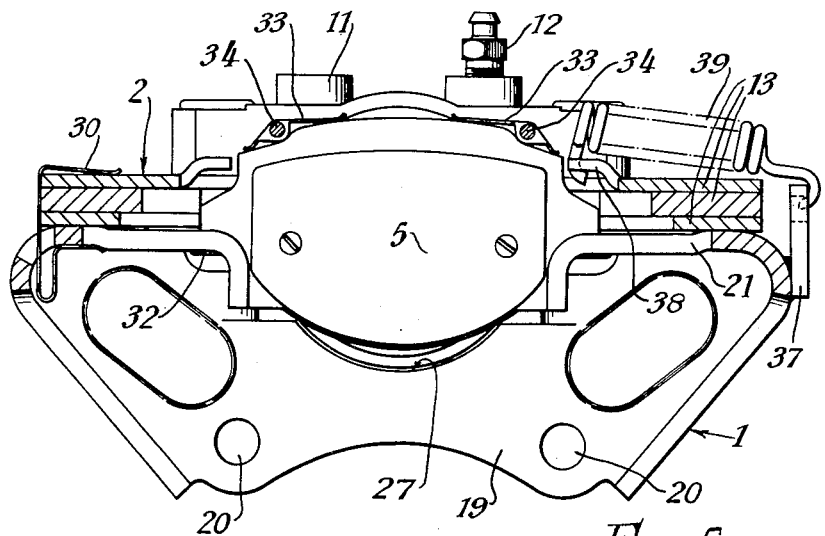
Figure 6:
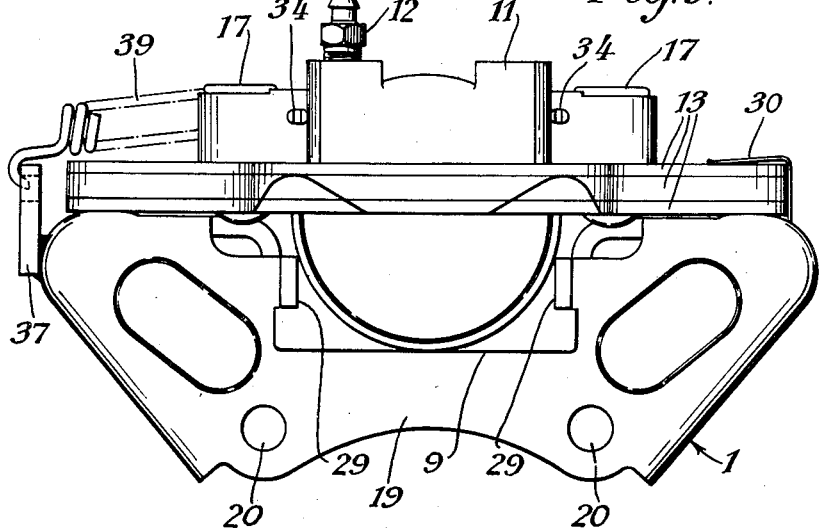
Figure 8:
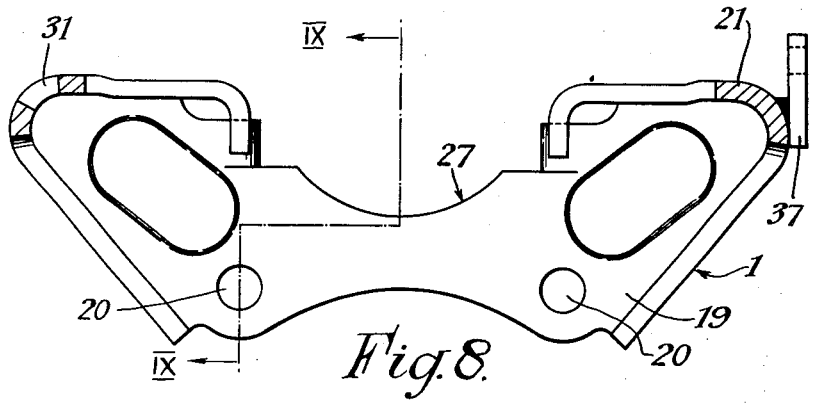
Figure 7:
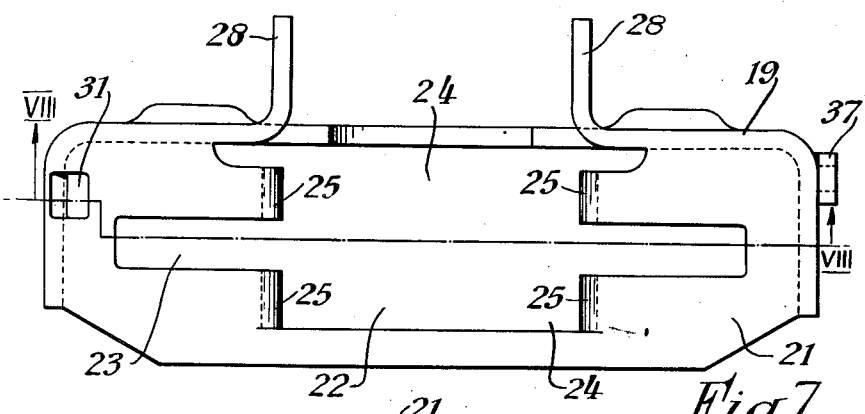
Figure 9:
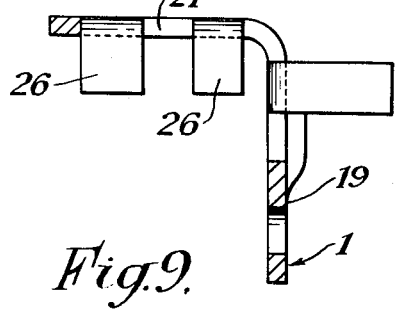
Figure 10:
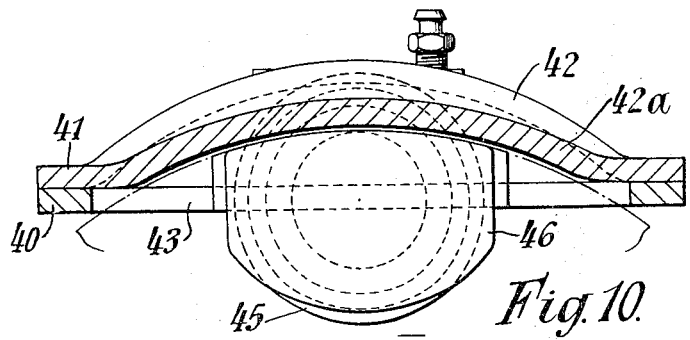
Figure 11:
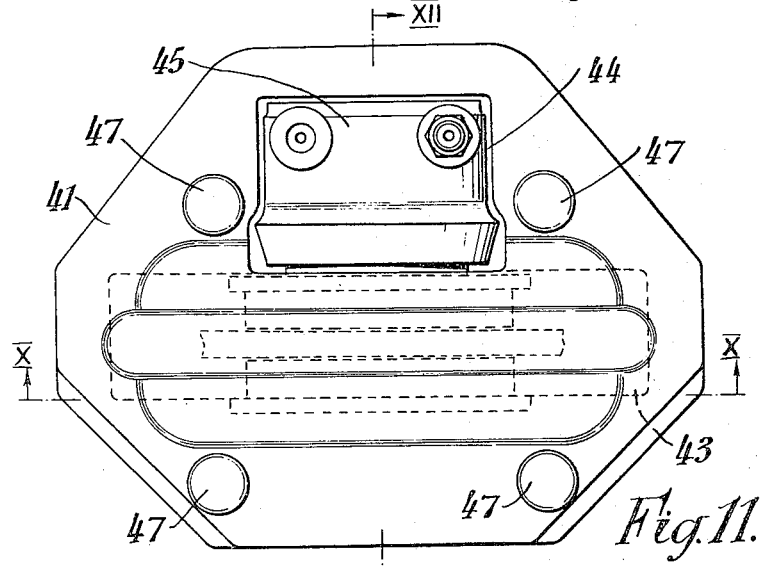
Figure 12:
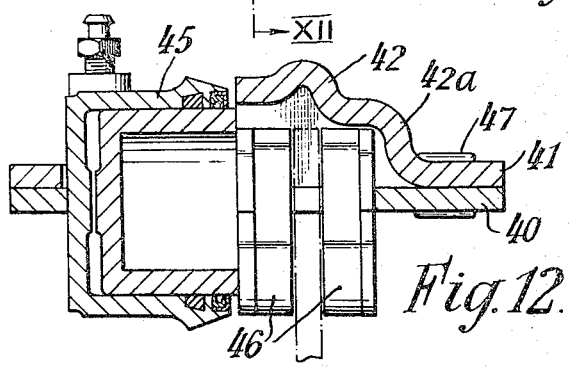

A fluid pressure operated disc brake according to one embodiment of the invention will now be described by way of example by aid of the accompanying drawings in which:

FIGURE 1 is a plan view of the disc brake;
FIGURE 2 is a fragmentary section on the line II—II of FIGURE 1;
FIGURE 3 is a side view of the disc brake as seen in the direction of arrow "A" of FIGURE 1;
FIGURE 4 is a section on the line IV—IV of FIGURE 3;
FIGURE 5 is an approximately central section on the line V—V of FIGURE 1;
FIGURE 6 is a side view as seen in the direction of arrow "B" in FIGURE 1;
FIGURE 7 is a plan view of the fixed support;
FIGURE 8 is a section on the line VII—VII of FIGURE 7;
FIGURE 9 is a section on the line IX—IX of FIGURE 8; and
FIGURES 10, 11 and 12 show a modified construction of a sliding member. FIGURE 10 is a section on the line X—X of FIGURE 11, FIGURE 11 is a top plan view of the modified construction, and FIGURE 12 a section on the line XII—XII of FIGURE 11.

Referring to FIGURES 1 to 9 of the accompanying drawings the disc brake comprises a fixed support denoted generally by the reference numeral 1, and a sliding member denoted generally by the reference numeral 2 carried by the fixed support, so as to be slidable in relation thereto. The fixed support 1 is adapted to be mounted on the stationary part of a wheel assembly with the sliding member 2 arranged in a plane normal to the plane of rotation of the brake disc, a fragmentary portion of which is shown at 3, the sliding member 2 having an opening 4 to receive a peripheral portion of the brake disc and brake pads 5, 6 disposed one on either side of the brake disc, each such pad being secured to a metal backing plate 7 and 8 respectively. The sliding member 2 carries a hydraulic cylinder 9 arranged on one side of the brake disc, the cylinder having a piston 10, and inlet and outlet openings 11 and 12 for connection to a fluid pressure system. In operation, outward movement of the piston 10 from the cylinder 11, resulting from the admission of pressure fluid to the hydraulic cylinder, results in movement of the brake pad 5 into contact with the brake 3, the reaction force thus set up, causing sliding movement of the sliding member 2 in a direction opposite to the movement of the brake pad 5, the resulting engagement of the abutment surface, formed by the inner edge of the opening 4 with the metal backing plate 8 of the brake pad 6, bringing the latter also into contact with the brake disc. In the construction shown, the fixed support 1 is provided with means, hereinafter described, which co-operate with the metal backing plates 7 and 8 of the brake pads 5 and 6 to restrain the pads against displacement, in a plane parallel to the plane of the brake disc, when in contact with the rotating brake disc, so that the drag force arising during a braking operation is taken directly by the fixed support, and not by the sliding member 2, the latter being subjected only to the clamping force.

In the particular construction shown in the drawings, the sliding member 2 is flat and is of laminar construction being built up from three separate plates 13 of sheet metal arranged one on top of the other and secured together adjacent one edge by rivets 14. Each plate in itself forms a closed loop around an opening therein, the openings jointly providing the opening 4 which thus extends through the thickness of the three plates when assembled one on top of the other. The opening 4 is shaped in plan form to provide two portions, a portion 15 for receiving the brake disc and pads, and a portion 16 receiving the hydraulic cylinder 9. The hydraulic cylinder 9 projects outwardly beyond the opposite faces of the plate, to which it is secured by rivets 17, which also serve to secure the plates 13 together, in addition to the rivets 14. The hydraulic cylinder is arranged with the outer end of the piston 10 facing towards the brake disc, the pad 5 being located between the piston end and one side of the brake disc, the other pad 6 being located between the opposite face of the brake disc, and an edge 18 of the portion 15 (FIG. 1) of the opening 4, such edge providing an abutment for contacting the metal backing 8 of the pad 6.

The fixed support 1, the construction of which is shown clearly in FIGURES 7, 8 and 9, is advantageously made as a sheet metal pressing, and is substantially L shape in cross section, the portion 19 having holes 20 adjacent one edge, referred to as the radially inner edge. The portion 21 which extends laterally at right angles to the vertical portion 19 forms a platform having a flat surface contacting the opposite flat face of the sliding member 2. Portion 21 is provided with an aperture 22, which in plan form, has a middle portion 23 to receive the peripheral portion of the brake disc, and aperture portions 24 on either side of the central portion 23 to receive the brake pads, the ends 25 of the aperture portions 24 being formed to provide lugs 26. The portion 19 is partially cut away in the central region to provide a gap to receive the hydraulic the central region top rovide a gap to receive the hydraulic cylinder 9, the edge 27 (FIG. 8), of the cut away portion of 19 being curved to conform to the contour of the cylinder which rests thereon, the opposite edges of the gap being formed with projections 28 (FIG. 8), each of which extends laterally in the opposite direction to the horizontal platform portion 21.

In the assembled disc brake, the sliding member 2 is mounted on the platform portion 21 of the fixed support 1 with the hydraulic cylinder 11 located in the gap 27 the projections 28 being engaged in appropriate slots 29 (FIG. 6) formed on either side of the hydraulic cylinder. A spring clip 30 (FIGS. 1, 5) passing through a slot 31 in the platform portion 21, has its opposite ends bent to engage the upper surface of the sliding member, and beneath the platform of the fixed support, respectively, so that the same are urged into contact. A tension spring 39 applies a lateral spring load to the sliding member 2, one end of the spring being anchored to a lug 37 on the fixed support 1, and the opposite end to a lug 38 (FIG. 5) on the sliding member 2. The spring loading thus provided serves to eliminate chatter in the brake. Each brake pad when in position in the appropriate aperture portion 24, is located radially in relation to the brake disc, by the engagement of stepped portions 32 of the metal backing plate with the ends 25 of lugs 26 of the aperture portions 24, a small clearance being provided between the edges of the stepped portions and the adjacent lugs 26 of the ends 25. Spring retaining plates 33 bear on the radially outer edges of the metal backing plate, to retain the pads in position, each spring retaining plate being secured by a split pin 34, each of which passes through aligned holes in lugs 35, and bosses 36 on the hydraulic cylinder 9, the lugs 35 projecting outwardly from the outer surface of the plate 13 forming the sliding member 2. Withdrawal of the split pins permits removal of the pads.

In use, the disc brake is located in position with the portion 19 of the fixed support 1 extending parallel to the plane of rotation of the brake disc, the fixed support being secured to a fixed part of the wheel assembly, by bolts passing through the bolt holes 20, so that the sliding member 2 extends in a plane normal to the plane of rotation of the brake disc. During brake operation upon the admission of pressure fluid to the hydraulic cylinder 9, the brake pad 5 is moved into contact with the brake disc, the reactionary force set up resulting in sliding movement of the sliding member 2, thus causing the abutment edge 18 to pull the brake pad 6 also into engagement with the brake disc. During the sliding movement, the sliding member 2 is guided by the guiding means provided by the projections 28 in the slots 29 along side the cylinder 11. The drag force resulting from engagement of the brake pads with the rotating brake disc is transmitted directly to the fixed support through the metal backing plates and the lugs 26, so that as previously stated the sliding member 2 is not subjected to this force.

Whilst a sliding member which is flat and either of one piece construction or of laminar construction, for example the laminar construction disclosed in the above described embodiment, is advantageous in practice, it will be appreciated that the sliding member can be constructed so as to be other than flat. Thus the sliding member can have a curved or other shaped profile in section as distinct from the plain rectangular section profile presented by the flat construction.

In the modified construction of sliding member shown in FIGURES 10, 11 and 12 the sliding member is constructed from two plates, a plate 40 which is wholly flat and a plate 41 which is pressed to provide curved portions 42 and 42a displaced out of the plane of the plate. The flat plate 40 has an opening 43, which is of T shape in plan form, and the plate 41 has a rectangular opening 44 offset to one side of the curved portions 42, 42a. When the plates are assembled one on top of the other, the rectangular opening 44 forms a common opening with a portion of the opening 43, to receive a hydraulic cylinder 45 disposed at one side of the brake disc and forming the brake actuating means, the remainder of the opening 43 receiving a peripheral portion of the brake disc and the brake pads 46, the curved portions 42, 42a extending over the brake pads and the brake disc periphery. The hydraulic cylinder 45 is a press fit in the receiving portion of the T-shaped opening 43 so that the same is located in position, the cylinder being secured to the plate 40 by welding or brazing, the plates 40 and 41 being secured together by rivets 47 so that the whole forms a unitary structure.

The exposed side of the wholly flat plate 40 provides a flat surface for engaging a complementary surface of a fixed support for the sliding member, for example the platform 21 of the fixed support 1 disclosed in the above described embodiment.

Automatic adjusting means of any suitable kind are preferably included in the disc brake to compensate for wear on the brake pads.

I claim:

1. A disc brake assembly for a rotating brake disc comprising a fixed support member substantially L-shape in cross section providing a vertical portion and horizontal portion being a continuous closed loop, said horizontal portion forming a fixed platform with a central opening therein, a horizontal sliding member disposed on the top surface of said horizontal portion, means connecting said sliding member to said top surface to permit slidable movement of said sliding member with respect to said horizontal surface, said sliding member including a flat integral rectangular plate forming a closed continuous loop having a central opening therein in alignment with said opening in said horizontal portion, a rotating brake disc extending into said central openings, brake pad means disposed in said openings on opposite sides of and adjacent said brake disc for applying a braking force thereto, hydraulic cylinder brake actuating means disposed in said central opening of said sliding member and fixed thereto for movement therewith, said actuating means being disposed adjacent one of said brake pad means and opposite said rotating brake disc for forcing said pad means against said brake disc, guide means on said fixed support abutting said actuating means to guide said actuating means in a direction perpendicular to the surface of said rotating disc, and abutment means on the sides of said horizontal portion of said fixed support adjacent said brake pad means for engaging said pad means to transmit drag force directly to said fixed support.

2. A disc brake according to claim 1 wherein the sliding member is arranged on the fixed support so that it lies in a plane normal to the plane of rotation of the brake disc.

3. A disc brake according to claim 2 wherein the sliding member is constructed from at least two flat laminar plates arranged one on the other and secured together to provide a unitary structure.

4. The disc brake of claim 1 wherein said abutment means comprise lugs extending downwardly from the horizontal portion of said fixed support.

5. The disc brake of claim 4 wherein said guide means comprise lugs extending laterally outwardly and away from the vertical portion of said fixed support.

6. The disc brake of claim 1 wherein said sliding member consists of at least three laminated plates.

7. The disc brake of claim 3 wherein one of said plates has a curved portion displaced out of the plane of the plate.

8. The disc brake of claim 7 wherein said central opening formed in said plates consists of a T-shape opening and a rectangular opening.

9. A disc brake according to claim 4 wherein the abutment means is provided by an edge of the central opening of said fixed support.

10. The disc brake of claim 1 wherein the sliding member and fixed support are formed of sheet metal.

11. A disc brake assembly for a rotating brake disc comprising a one-piece fixed support member forming a closed loop with a central opening perpendicular to the plane of rotation of the brake disc, a single sliding member forming a closed loop with a central opening perpendicular to the plane of rotation of the brake disc, said fixed and sliding members having their openings in vertical alignment with each other, means connecting said single sliding member to the top surface of said fixed support member to permit slidable movement in one direction only with respect to said fixed member when a braking force is applied, a rotating brake disc extending into said central openings, brake pad means disposed in said openings on opposite sides of and adjacent said brake disc for applying a braking force thereto, brake actuating means disposed in said central opening of said sliding member and fixed thereto for movement therewith, said actuating means being disposed adjacent one of said brake pad means and opposite said rotating disc for forcing said pad means against said brake disc.

References Cited in the file of this patent

UNITED STATES PATENTS

| | | |
|---|---|---|
| 2,784,811 | Butler | Mar. 12, 1957 |
| 2,820,530 | Chouings et al. | Jan. 21, 1958 |
| 3,065,829 | Bessler et al. | Nov. 27, 1962 |
| 3,081,843 | Dotto et al. | Mar. 19, 1963 |

FOREIGN PATENTS

| | | |
|---|---|---|
| 1,017,034 | Germany | Oct. 3, 1957 |
| 1,078,886 | Germany | Mar. 31, 1960 |
| 717,350 | Great Britain | Oct. 27, 1954 |
| 1,227,386 | France | Mar. 7, 1960 |
| 551,076 | Italy | Nov. 15, 1956 |